US008244412B2

(12) United States Patent
Myers et al.

(10) Patent No.: US 8,244,412 B2

(45) Date of Patent: Aug. 14, 2012

(54) SYSTEM AND METHODS FOR ON-BOARD PRE-FLIGHT AIRCRAFT DISPATCHING

(75) Inventors: Robert J. Myers, Mukilteo, WA (US); Michael P. Snow, Langley, WA (US)

(73) Assignee: The Boeing Company, Chicago, IL (US)

( * ) Notice: Subject to any disclaimer, the term of this patent is extended or adjusted under 35 U.S.C. 154(b) by 2537 days.

(21) Appl. No.: 11/067,181

(22) Filed: Feb. 25, 2005

(65) Prior Publication Data

US 2010/0036547 A1 Feb. 11, 2010

(51) Int. Cl.
*G05D 1/00* (2006.01)
*G01N 17/00* (2006.01)

(52) U.S. Cl. ........... 701/3; 701/29.1; 701/33.1; 701/227

(58) Field of Classification Search ........................ None
See application file for complete search history.

(56) References Cited

U.S. PATENT DOCUMENTS 4,713,661 A 12/1987 Boone et al.
4,734,863 A 3/1988 Honey et al.
4,799,162 A 1/1989 Shinkawa et al.
4,891,650 A 1/1990 Sheffer
5,122,959 A 6/1992 Nathanson et al.
5,155,689 A 10/1992 Wortham
5,731,785 A 3/1998 Lemelson et al.
5,736,962 A 4/1998 Tendler
6,088,648 A 7/2000 Shah et al.
6,597,294 B1 * 7/2003 Ariens ..................... 340/995.26
6,606,557 B2 8/2003 Kotzin
6,696,956 B1 2/2004 Uchida et al.
6,711,500 B2 3/2004 Chen
7,131,136 B2 * 10/2006 Monroe ........................ 725/105
7,173,526 B1 * 2/2007 Monroe ........................ 340/521
2002/0032006 A1 * 3/2002 Nair et al. ....................... 455/66
2002/0039072 A1 * 4/2002 Gremmert et al. ............ 340/945
2002/0130814 A1 * 9/2002 Smith et al. ................... 342/465
2002/0143443 A1 * 10/2002 Betters et al. ................... 701/29
2003/0003872 A1 * 1/2003 Brinkley et al. ................ 455/66
2003/0030581 A1 * 2/2003 Roy ............................... 342/36
2003/0055975 A1 * 3/2003 Nelson et al. ................. 709/227
2003/0069015 A1 * 4/2003 Brinkley et al. .............. 455/431
2003/0109973 A1 * 6/2003 Hensey et al. .................. 701/35
2003/0130769 A1 * 7/2003 Farley et al. ...................... 701/3
2005/0149238 A1 * 7/2005 Stefani et al. ................... 701/33
2005/0288831 A1 * 12/2005 Lusardi et al. .................... 701/3

* cited by examiner

*Primary Examiner* — Khoi Tran
*Assistant Examiner* — Ian Jen

(57) ABSTRACT

Systems and methods for providing pre-flight dispatching are disclosed. In one embodiment, a system for on-board dispatching of an aircraft includes a flight dispatching apparatus positioned within the aircraft that is configured to perform one or more flight dispatching tasks. A communications apparatus is configured to exchange wireless signals between the dispatching apparatus and one or more ground-based facilities. In another embodiment, a method of dispatching an aircraft includes designating a person to perform predetermined dispatching tasks, and establishing a wireless data connection between the aircraft and at least one ground-based facility. Information obtained from the at least one ground-based facility is then processed to perform the one or more dispatching tasks, and at least a portion of the processed information is communicated to the at least one ground-based facility using the wireless data connection.

21 Claims, 4 Drawing Sheets

SYSTEM AND METHODS FOR ON-BOARD PRE-FLIGHT AIRCRAFT DISPATCHING

FIELD OF THE INVENTION

This invention relates generally to commercial air carrier operations, and more particularly, to systems and methods for providing pre-flight dispatching for aircraft engaged in commercial operations.

BACKGROUND OF THE INVENTION

Commercial air carriers are required to obtain an air carrier certification and to conduct commercial operations in conformity with specified regulations. For example, within the United States, scheduled commercial air service is governed by regulations as described in detail in Title 14, Code of Federal Regulations Chapter 1, Part 121 ("Part 121"). In general terms, Part 121 regulates the conduct of flight operations, mandates aircraft equipment and performance requirements, provides crew qualification and training requirements, and outlines required maintenance operations for the certificated air carrier. Air carrier operations in other jurisdictions may be similarly regulated, as those skilled in the art will readily recognize.

Air carriers typically staff and maintain dispatch centers to control selected operational details related to the air carrier's operations. For example, a dispatch center typically performs various pre-flight planning tasks required for a scheduled flight, monitors the progress of the scheduled flight, and may issue other information that may affect the safety of the flight. Since the dispatch centers must provide the foregoing services throughout an entire route structure used by the air carrier, a plurality of dispatch centers are typically maintained by the carrier, and are generally positioned at various locations in the route structure.

The dispatch centers are manned by one or more aircraft flight dispatchers that share joint responsibility with the pilot-in-command (PIC) of a scheduled flight for the safe and efficient operation of the aircraft. Accordingly, the aircraft flight dispatcher is typically responsible for pre-flight tasks pertaining to the scheduled flight, including analyzing and evaluating meteorological information pertaining to the flight to determine if potential hazards to flight exist. The flight dispatcher also typically selects an appropriate flight route and altitude for the flight, and performs selected flight calculations such as constructing a flight plan that includes a projected fuel-burn, compiles a load plan for the aircraft, performs weight and balance calculations, and also obtains other informational components that may be required for the safe completion of the flight. Based upon the foregoing, a dispatch release document is generated that is approved and signed by the dispatcher. The flight dispatcher also typically generates a flight plan that is filed with the appropriate air traffic control facility. Once the scheduled flight departs, the flight dispatcher may actively monitor the progress of the flight, and assist the flight crew as required.

Since the aircraft flight dispatcher works with the PIC of the scheduled flight to accomplish the foregoing tasks, the flight dispatcher must be properly trained, and in the United States, must obtain a certificate issued by the Federal Aviation Administration (FAA) to indicate that the certificated person understands the pertinent FAA regulations, radio communication procedures and protocols, weather analysis, aircraft performance characteristics, air traffic control procedures and navigational facilities, as well as other specialized knowledge. After a flight dispatcher has acquired the necessary FAA certification, the knowledge and skills of the flight dispatcher are periodically tested to ensure that a safe level of performance may be expected from the flight dispatcher.

Since each dispatch center requires a staff of trained dispatchers, the cost of maintaining flight dispatch centers is considerable. Additional costs are incurred in supporting the physical space requirements and infrastructure required for the dispatch centers. Accordingly, there is a need for systems and methods that permit an air carrier to significantly reduce the costs associated with aircraft dispatch requirements.

SUMMARY OF THE INVENTION

Systems and methods for providing pre-flight dispatching for aircraft engaged in commercial operations are disclosed. In one aspect, a system for on-board dispatching of an aircraft includes a flight dispatching apparatus positioned within the aircraft that is configured to perform one or more flight dispatching tasks. A communications apparatus is configured to exchange wireless signals between the dispatching apparatus and one or more ground-based facilities. In another aspect, a method of dispatching an aircraft using an on-board dispatching system includes designating a person to perform predetermined dispatching tasks, and establishing a wireless data connection between the aircraft and at least one ground-based facility. Information obtained from the at least one ground-based facility is then processed to perform the one or more dispatching tasks, and at least a portion of the processed information is communicated to the at least one ground-based facility using the wireless data connection.

BRIEF DESCRIPTION OF THE DRAWINGS

Preferred and alternate embodiments of the present invention are described in detail below with reference to the following drawings.

DETAILED DESCRIPTION OF THE INVENTION

The present invention relates to systems and methods for providing pre-flight dispatching for aircraft. Many specific details of certain embodiments of the invention are set forth in the following description and in FIGS. 1 through 4 to provide a thorough understanding of such embodiments. One skilled in the art, however, will understand that the present invention may have additional embodiments, or that the present invention may be practiced without several of the details described in the following description.

Figure 1:
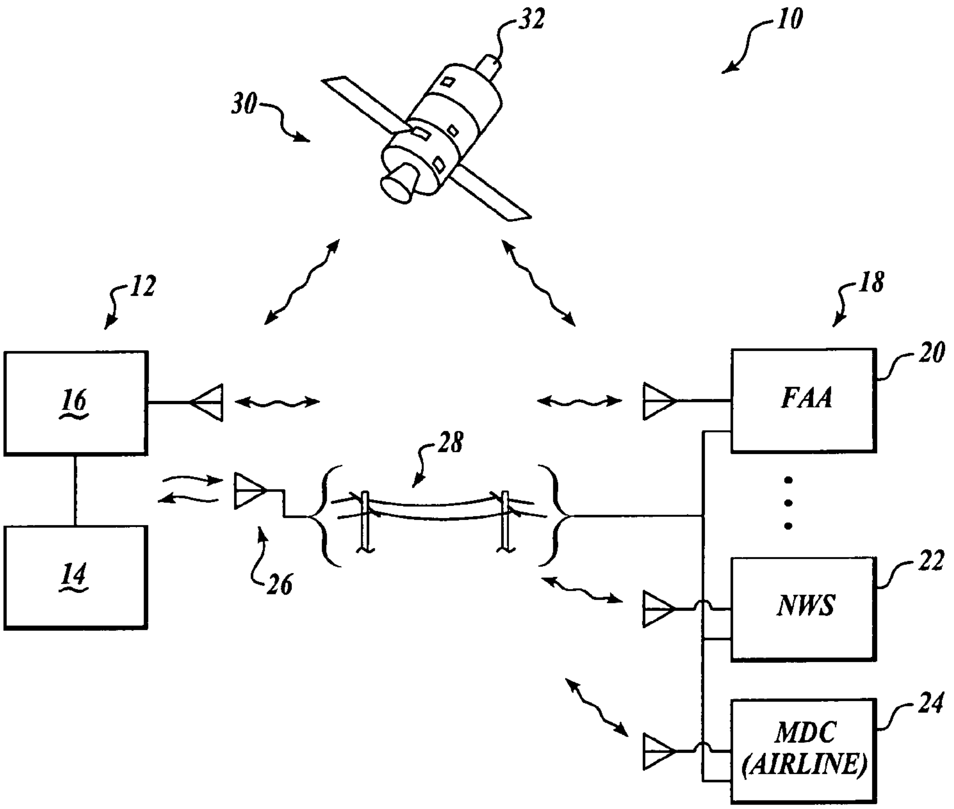
FIG. 1 is a schematic view of a system for on-board pre-flight dispatching of an aircraft according to an embodiment of the invention.

FIG. 1 is a schematic view of a system 10 for on-board pre-flight dispatching of an aircraft according to an embodiment of the invention. The system 10 includes a dispatching apparatus 12 that is positioned within an aircraft that is subject to a dispatch requirement. The dispatching apparatus 12 includes a dispatching workstation 14 that is configured to perform at least a portion of the usual functions associated with dispatching an aircraft. In one particular embodiment, the dispatching workstation 14 performs one or more of the functions required to support aircraft operations as set forth in Part 121. In alternate embodiments, the dispatching workstation 14 may be adapted to perform functions specified by other suitable entities, including, for example, those functions or procedures established by regulatory agencies of other countries, of military organizations, of the management organizations of the air carriers, or any other suitable entity.

The dispatching workstation 14 is positioned within the aircraft in a location that is generally accessible to one or more of the flight crew members of the aircraft. Accordingly, the dispatching workstation 14 may be positioned in a flight deck of the aircraft, or it may be positioned in other areas accessible to the flight crew, such as a crew rest area in the aircraft. The dispatching workstation 14 will be described in greater detail below. The dispatching workstation 14 is coupled to a communications transceiver 16 positioned within the aircraft that is operable to exchange wireless signals with one or more ground-based facilities 18. For example, the ground-based facilities 18 may include selected FAA Facilities 20 such as an FAA Automated Flight Service Station (AFSS), an Enroute Air Traffic Control Center (ATC), a Terminal Radar Approach Control Facility (TRACON), or a Control Tower facility at a specified airport, or other known facilities. The ground-based facilities 18 may further include a weather reporting station 22 maintained by the National Weather Service (NWS) or other comparable governmental or private organizations. The ground-based facilities 18 may further include a main dispatch center (MDC) 24 that is staffed and maintained by an air carrier. In one particular embodiment, the MDC 24 may perform all of the dispatching tasks required for Part 121 operations, but is geographically remote from the aircraft. For example, the aircraft may be positioned in a geographical region that is substantially remote from a geographical region that includes the main dispatch center 24.

Still referring to FIG. 1, the dispatching apparatus 12 may directly wirelessly communicate with one or more of the ground-based facilities 18 through a very high frequency (VHF) and/or an ultra high frequency (UHF) communications system, or even a terrestrial-based microwave communications system. In another particular embodiment, the apparatus 12 may wirelessly communicate with one or more of the ground-based facilities 18 by means of the AVINET System available from Aeronautical Radio, Inc. (ARINC) of Annapolis, Md. Alternately, in another particular embodiment, the dispatching apparatus 12 may communicate with a remote communications outlet 26 positioned at an airport where the aircraft is positioned. The remote communications outlet 26 is configured to wirelessly communicate with the aircraft, and is coupled to terrestrial communications lines 28, such as a public telephone network, a fiber-optic communications network, a digital subscriber (DSL) network, or over coaxial lines configured to operate in connection with a cable modem communications system. In still another particular embodiment, the remote communications outlet 26 may include a selected one of the plurality of ground communications stations maintained by ARINC that are configured to communicate with the aircraft by means of the Aircraft Communications Addressing and Reporting System (ACARS) using VHF and/or ultra high frequency UHF radio communications. In a specific embodiment, the ACARS system may employ the Gate Aircraft Terminal Environment Link (GATELINK) communications service, also available from ARINC. In still another particular embodiment of the invention, the dispatching apparatus 12 may communicate with one or more of the ground-based facilities 18 through a satellite-based communications system 30 having one or more communications satellites 32. Accordingly, the communications transceiver 16 of the dispatching apparatus 12 is configured to support satellite communications (SATCOM) between the apparatus 12 and the ground-based facilities 18.

Figure 2:
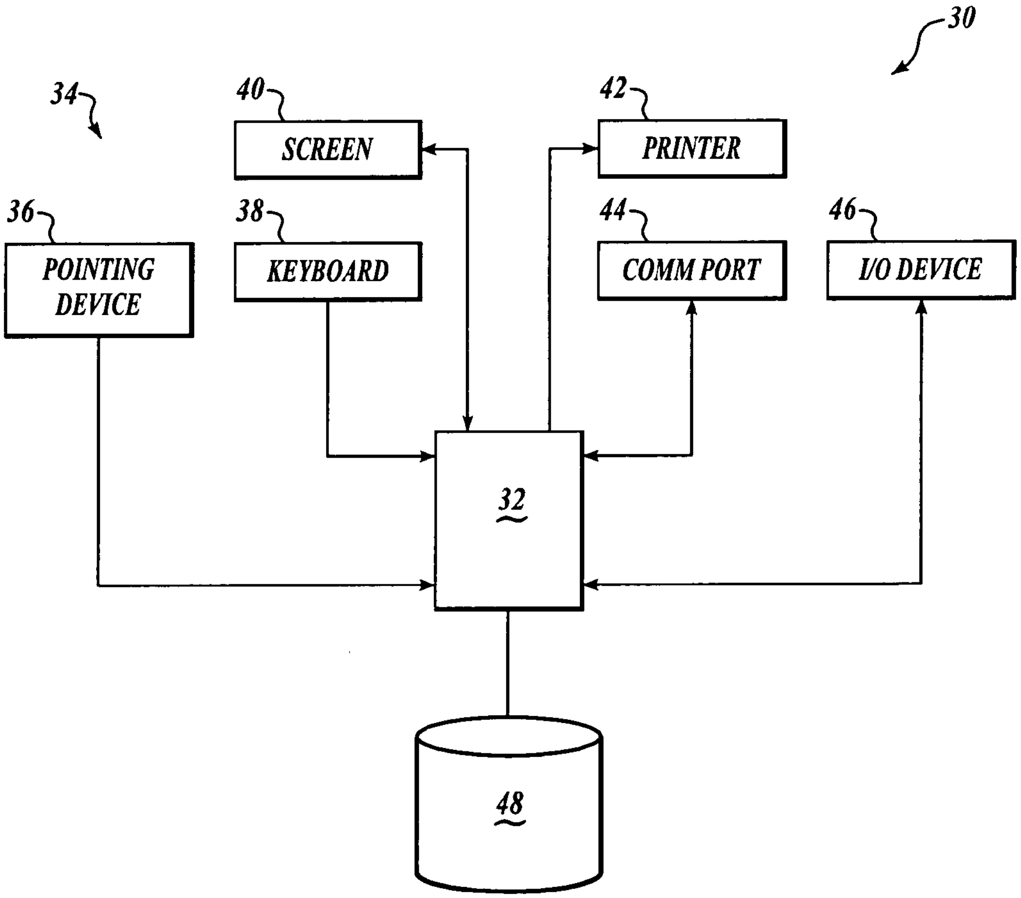
FIG. 2 is a block diagrammatic view of a dispatching workstation according to another embodiment of the invention.

FIG. 2 is a block diagrammatic view of a dispatching workstation 30 according to another embodiment of the invention. The workstation 30 includes a processor 32, which generally includes any programmable electronic device configured to receive programming instructions and input data, and to process the data according to the programming instructions. The processor 32 is coupled to a plurality of external devices 34, including a pointing device 36 operable to provide input commands to the processor 32, a keyboard 38 for the entry of text information and commands to the processor 32, a viewing screen 40 for viewing information generated by the processor 32. Other external devices 34 may include a printer 42 operable to generate a printed copy of information generated by the processor 32, and a communications port 44 that permits the dispatching workstation 30 to communicate with the communications transceiver 16 (FIG. 1). Other external devices that may be coupled to the processor 32, including voice-recognition devices and touch-screen devices (not shown in FIG. 2). The dispatching workstation 30 may also include an input/output device 46 operable to receive a removable data storage medium, such as a magnetic disk, an optical disk, a tape device or other similar devices so that information generated by the processor may be transferred to the removable storage medium.

The dispatching workstation 30 also includes a storage device 48 configured to receive and store data that is required to generate selected aircraft dispatching information. For example, the storage device 48 may include weight and balance data and/or performance and aerodynamic information for the aircraft. The storage device 48 may also receive and store various databases that may be required for flight plan compilation. For example, a navigational database that includes high and low altitude enroute environments, approach and departure procedures, and other related information may be hosted on the storage device 48. Suitable databases that include navigational and approach and departure information are available from Jeppeson-Sanderson, Inc. of Englewood Colo., although other suitable alternatives exist.

With continued reference to FIG. 1 and FIG. 2, the operation of the system for on-board pre-flight dispatching will now be described in detail. As outlined above, various flight dispatching tasks must be performed before a regularly scheduled flight commences. Since the knowledge and skills of the flight dispatcher are also generally possessed by flight crewmembers having a suitable commercial flight rating, a designated person, such as a flight crewmember assigned to the scheduled flight may perform the flight dispatching tasks at the dispatching workstation 14. Alternately, an off-duty flight crewmember that is traveling on the scheduled flight, or even a properly certificated flight dispatcher that boards the aircraft may perform the flight dispatching tasks at the dispatching workstation 14. In any case, the designated person establishes a data connection between the dispatching apparatus 12 and the ground-based facilities 18 using any of the communications systems previously described. When the connection is established, the designated person then obtains selected information from the ground-based facilities 18 that are required to accomplish the dispatching tasks. For example, the designated person may establish a connection with an FAA Facility 20 such as an Automated Flight Service Station (AFSS) to obtain weather data for the scheduled flight, and may further obtain other safety-related information for the flight route, such as any Notices to Airmen (NOTAMS) pertaining to the flight route. Alternately, when the designated person establishes the data connection, a position-sensing apparatus such as a Global Positioning System (GPS) may provide a position of the aircraft to the dispatching workstation 30 so that the workstation 30 obtains information pertaining to the airport at which the aircraft is positioned without intervention by the designated person. The designated person may then review the weather data, which may include scheduled terminal observations (METARs) for the departure and destination airports, terminal area forecasts (TAFs), in addition to any reports of significant meteorological events (SIGMETs), and any other required forecasts and/or weather updates. The weather data may also include selected graphical data, such as radar summaries, weather depiction charts, satellite imagery and prognostication charts. The designated person may also review any NOTAMs that may be available at this time. The designated person may also establish a data connection with an NWS facility 22, or other similar facilities to obtain additional weather information.

The designated person may then access various software programs and databases retained within the storage device 48 that assist the designated person in performing the dispatching tasks. For example, the designated person may review one or more preferred flight routes for the scheduled flight, and select a route based upon the prior review of the weather data and any NOTAMs affecting the flight route. Once a flight route is selected, the designated person may prepare a fuel plan for the flight that includes any additional fuel that may be required to overcome unfavorable winds aloft, a required reserve fuel amount, and any additional fuel amount that may be required to reach one or more weather-related alternate destinations. A weight and balance plan may be developed based upon the planned fuel load, passenger and luggage load estimates and known moment data for the aircraft that is stored within the storage device 48. The designated person may also review still other flight-related information. For example, the designated person may establish a data connection with the MDC 24 that is maintained by the air carrier and determine if any flight restrictions apply to the aircraft, which may be due to maintenance requirements, master minimum equipment list (MMEL) compliance, or for other reasons. Although flight route information, weight and balance data for the aircraft, and other similar information required to complete the various dispatching tasks may be stored on the storage device 48, it is understood that this information may alternately be present, at least in part, on storage devices maintained by the ground-based facilities 18, so that the required information may be obtained through a suitable data connection between the facilities 18 and the dispatching apparatus 12.

Once route selection, fuel planning, weight and balance calculations, and any other tasks required to properly dispatch the aircraft are completed, the designated person may prepare and electronically sign a dispatch release, establish a data connection with the MDC 24 and forward the signed dispatch release to the MDC 24. Alternately, the designated person may prepare the dispatch release and forward the prepared dispatch release to the MDC 24 for review and electronic signature. Approval of the dispatch release by the MDC 24 may then be communicated to the designated person using the data connection. The designated person may also submit a Flight Plan to the FAA Facility 20 for the planned flight through a suitable data connection in order to properly inform ATC of the scheduled flight. Alternately, the MDC 24 may perform this requirement during the review and signature process.

The data connection between the ground-based facilities 18 and the dispatching apparatus 12 may also be used to provide dispatch information to a selected airport information systems, such as a flight reservation system maintained by an airline, or to other airport information systems that generally provide arrival and departure information to passengers through information displays located within an airport terminal. In addition, the data connection may be employed to report a departure time for the aircraft, and to report other pertinent data, such as a fuel amount aboard the aircraft at the departure time.

Figure 3:
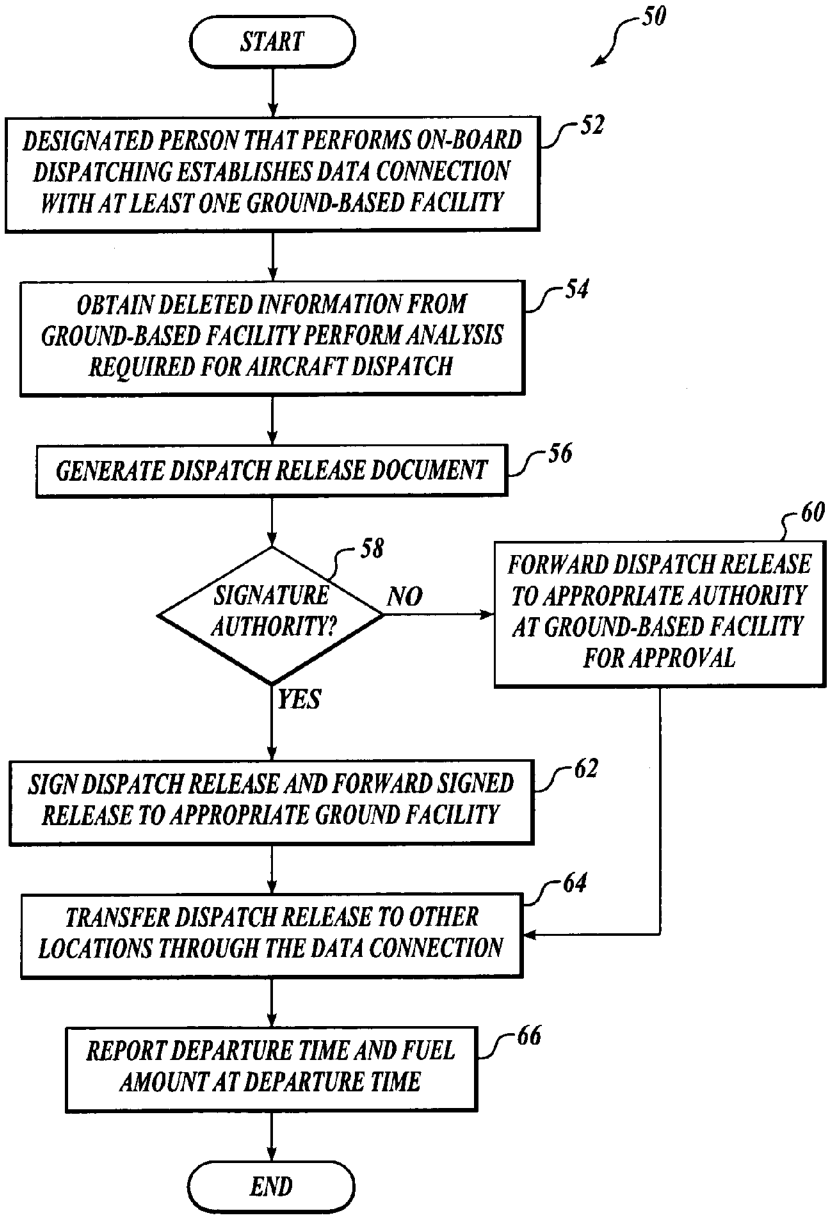
FIG. 3 is a flowchart that shows a method of on-board dispatching according to another embodiment of the invention.

FIG. 3 is a flowchart that shows a method 50 of on-board dispatching according to another embodiment of the invention. At block 52, a person that has been designated to perform the on-board dispatching establishes a data connection between the dispatching apparatus 12 and at least one of the ground-based facilities 18 (FIG. 1). The designated person may be a flight crewmember having both an Air Transport Pilot (ATP) certification and a flight dispatcher certification, a flight crewmember having an ATP rating and not having a dispatcher certification, a certificated flight dispatcher that boards the aircraft to perform the dispatching tasks at the workstation 14, or any other suitable person. At block 54, the designated person obtains selected information from the at least one of the ground-based facilities 18, which may include weather data, and any other meteorological information that may affect the safety of flight. The designated person then performs the tasks required to properly dispatch the aircraft, which may include fuel planning, weight and balance determinations, as well as any other analytical tasks that may be required. The required tasks may be performed using software programs and/or databases that are retained on a storage device 48 (FIG. 2) associated with the workstation 14, or the required tasks may be performed using software and/or databases that are remotely located relative to the workstation 14. For example, the software and/or databases may be located within the MDC 24 (FIG. 1).

At block 56, the dispatch release document is generated. As described earlier, the dispatch release document must be approved by a properly certificated individual. Accordingly, the method 50 determines if the designated person is authorized to approve the dispatch release document at block 58. If the designated person does not have the authority to sign the dispatch release document, the unsigned document is forwarded to an appropriate ground-based facility (e.g., the MDC 24) at block 60 where the document may be electronically signed. The signed dispatch release document may then be communicated to the workstation 14. Otherwise, if the designated person has the authority to sign the dispatch release document, at block 62 the designated person electronically signs the document and forwards a copy to the appropriate ground-based facility 18. At block 64, the signed dispatch release document is transferred over the data connection to other ground-based facilities 18, such as a flight reservation system or to other airport information systems. In addition, the designated person may file a flight plan with the AFSS, or other FAA facilities through the data connection. At block 66, the departure time and fuel amount may be reported to a selected one of the ground-based facilities 18 (such as the MDC 24) over the data connection.

Figure 4:
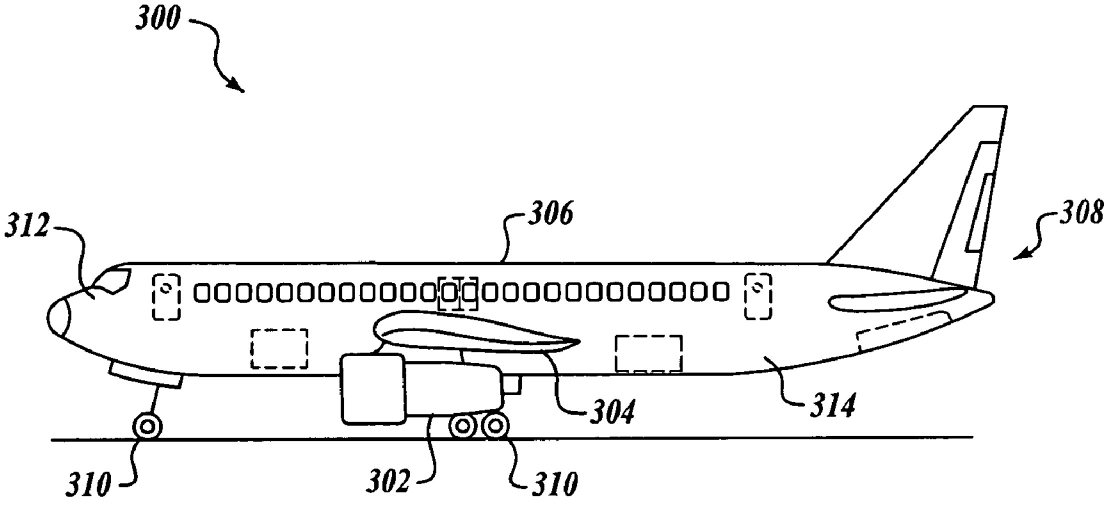
FIG. 4 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 4, a side elevation view of an aircraft 300 having one or more of the disclosed embodiments of the present invention is shown. With the exception of the embodiments according to the present invention, the aircraft 300 generally includes components and subsystems known in the pertinent art, and in the interest of brevity, will not be described in detail. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 4), as well as a plurality of other electrical, mechanical and electromechanical systems that cooperatively perform a variety of tasks necessary for the operation of the aircraft 300. The aircraft 300 also includes one or more of the embodiments of the system for on-board aircraft dispatching 314 according to the present invention, which may be incorporated into various on-board locations within the aircraft 300.

Although the aircraft 300 is generally representative of a commercial passenger aircraft, which may include, for example, the 737, 747, 757, 767 and 777 commercial passenger aircraft available from The Boeing Company of Chicago, Ill., it should be understood that the various embodiments of the present invention may also be incorporated into flight vehicles of other types, including military aircraft, cargo aircraft, and other aircraft that are not involved in the commercial transport of passengers. Examples of such flight vehicles are illustrated more fully in various descriptive volumes, such as Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for on-board dispatching of an aircraft, comprising:

a flight dispatching apparatus positioned within the aircraft that is configured to perform one or more of the following flight dispatching tasks on-board the aircraft: preparing a weight and balance plan, preparing a fuel burn plan, preparing a flight plan, and preparing a flight dispatch release; and a communications apparatus positioned within the aircraft and operatively coupled to the flight dispatching apparatus, the communications apparatus being configured to exchange wireless signals between the flight dispatching apparatus and one or more ground-based facilities.

2. The system of claim 1, wherein the flight dispatching apparatus is positioned within one of a flight deck compartment and a crew rest position within the aircraft.

3. The system of claim 1, wherein the flight dispatching apparatus comprises a dispatching workstation, and the communications apparatus comprises a wireless transceiver configured to exchange wireless signals with the one or more ground-based facilities.

4. The system of claim 3, wherein the dispatching workstation is configured to prepare at an aircraft dispatch release document.

5. The system of claim 3, wherein the dispatching workstation further comprises a storage device configured to receive and store at least one of weight and balance data for the aircraft, performance data for the aircraft and navigational data for the aircraft.

6. The system of claim 3, wherein the wireless transceiver further comprises at least one of a very high frequency (VHF) transceiver, an ultra high frequency (UHF) transceiver, and a satellite communications (SATCOM) system.

7. A method comprising using a computer and communications system, both onboard an aircraft, to share flight dispatching tasks with a main dispatch center (MDC), the tasks performed on-board the aircraft including at least one of preparing a weight and balance plan, preparing a fuel burn plan, preparing a flight plan, and preparing a flight dispatch release.

8. The method of claim 7, further comprising establishing a wireless data connection with at least one of an air traffic control facility, a weather reporting facility and a remote dispatching facility.

9. The method of claim 7, wherein the on-board tasks include preparing a dispatch release document.

10. The method of claim 9, further comprising signing the dispatch release document and transferring the signed dispatch release document to the MDC via a data link.

11. The method of claim 9, further comprising submitting the dispatch release document to the MDC for signature via a data link.

12. The method of claim 7, wherein the on-board tasks include reporting at least one of a departure time and a fuel amount corresponding to the departure time.

13. An aerospace vehicle, comprising:

a fuselage having at least one internal compartment; and;

a flight dispatching apparatus positioned within the at least one internal compartment, the flight dispatching apparatus comprising:

a dispatching workstation operable to perform selected pre-flight dispatching tasks aboard the aircraft, the tasks including preparing at least one of a weight and balance plan, a fuel burn plan, a flight plan, and a flight dispatch release; and a communications transceiver coupled to the dispatching workstation and configured to communicate with one or more ground-based facilities.

14. The aerospace vehicle of claim 13, wherein the flight dispatching apparatus is positioned within one of a flight deck compartment and a crew rest position within the aircraft.

15. The aerospace vehicle of claim 13, wherein the dispatching workstation is configured to prepare an aircraft dispatch release document.

16. The aerospace vehicle of claim 15, wherein the dispatching workstation is further configured to digitally sign the dispatch release document.

17. The aerospace vehicle of claim 15, wherein the dispatching workstation is further configured to forward the dispatch release document to at least one of the ground-based facilities, further wherein the at least one ground-based facilities digitally signs the dispatch release document.

18. The aerospace vehicle of claim 13, wherein the communications transceiver is further configured to establish a wireless data link between the dispatching workstation and at least one of a weather information facility, an air traffic control facility and a dispatch center located at a location that is remote from the aerospace vehicle.

19. The aerospace vehicle of claim 13, wherein the communications transceiver comprises at least one of a very high frequency (VHF) transceiver, an ultra high frequency (UHF) transceiver and a satellite communications (SATCOM) system.

20. The method of claim 7, further comprising designating one of a flight crewmember assigned to the aircraft and a flight dispatcher that boards the aircraft to perform the on-board tasks.

21. The method of claim 7, wherein the tasks performed by the MDC include at least one of on-ground preparation of aircraft position reports, recommendation of flight plan alternatives, rescheduling of flights, and dissemination of flight information to others.

* * * * *